United States Patent [19]
Malloy, III et al.

[11] Patent Number: 5,459,996
[45] Date of Patent: Oct. 24, 1995

[54] HYBRID SOLAR ROCKET UTILIZING THERMAL STORAGE FOR PROPULSION AND ELECTRICAL POWER

[75] Inventors: John D. Malloy, III, Goode; Richard F. Rochow; James B. Inman, both of Forest, all of Va.

[73] Assignee: The Babcock & Wilcox Company, New Orleans, La.

[21] Appl. No.: 297,678

[22] Filed: Aug. 29, 1994

[51] Int. Cl.$^6$ ....................................... F02G 1/00
[52] U.S. Cl. .................. 60/200.1; 60/203.1; 126/680
[58] Field of Search ................. 60/200.1, 203.1; 126/680, 684

[56] References Cited

U.S. PATENT DOCUMENTS

| | | | |
|---|---|---|---|
| 3,064,418 | 11/1962 | Sanders | 60/203.1 |
| 3,097,480 | 7/1963 | Sohn | 60/203.1 |
| 4,354,348 | 10/1982 | Lee | 60/203.1 |
| 4,509,333 | 4/1985 | Nussdorfer et al. | 60/203.1 |
| 4,528,978 | 7/1985 | Robinson | 60/203.1 |
| 4,585,191 | 4/1986 | Blount | 60/203.1 |
| 4,707,979 | 11/1987 | Gutsche | 60/203.1 |
| 4,781,018 | 11/1988 | Shoji | 60/203.1 |
| 4,815,443 | 3/1989 | Vrolyk et al. | 126/438 |
| 4,830,092 | 5/1989 | Lee | 165/1 |
| 4,903,479 | 2/1990 | Christe | 60/203.1 |
| 5,138,832 | 8/1992 | Pande | 60/203.1 |

Primary Examiner—Richard A. Bertsch
Assistant Examiner—Howard R. Richman
Attorney, Agent, or Firm—Daniel S. Kalka; Robert J. Edwards

[57] ABSTRACT

A solar rocket for propelling and powering the electronics of a spacecraft includes a black body cavity of thermal storage material. Propulsion tubes and a connected nozzle axially extend through the black body cavity for burning propellant in order to provide thrust for the rocket. An insulation sleeve is removably located at the outer periphery of the cavity of thermal storage material. Energy conversion diodes surround the insulation sleeve. The thermal storage material, the insulation sleeve and the energy conversion diodes form a receiver. The receiver has a pair of spaced apart holes therethrough which lead into an interior space of the black body cavity in order to receive sunlight. A mirror assembly is located near each hole of the receiver for harnessing sunlight and providing radiant energy through the holes into the internal space of the black body cavity.

20 Claims, 4 Drawing Sheets

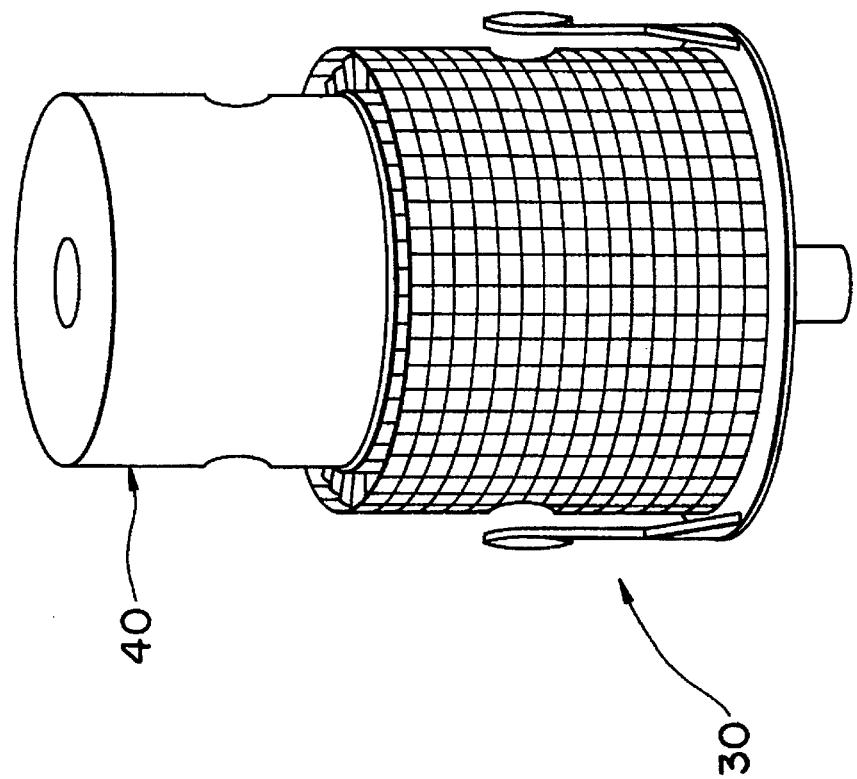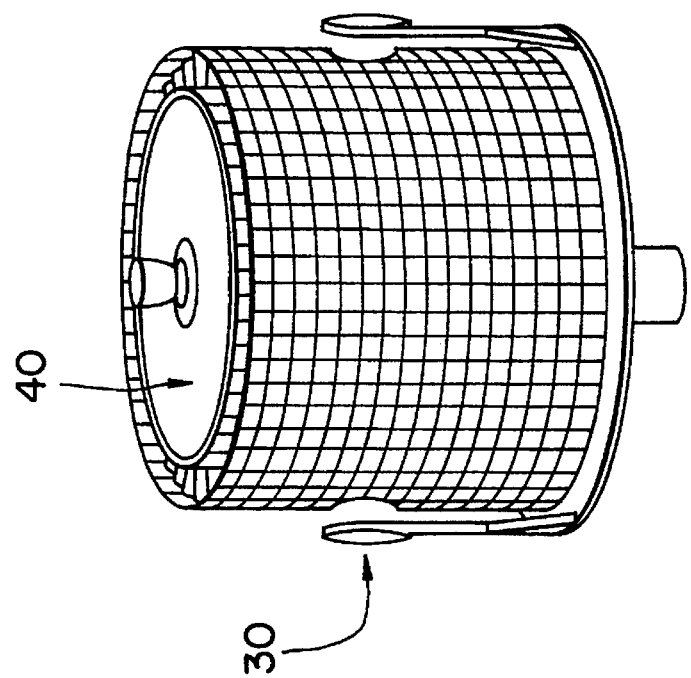

HYBRID SOLAR ROCKET UTILIZING THERMAL STORAGE FOR PROPULSION AND ELECTRICAL POWER

BACKGROUND OF THE INVENTION

1. Field of the Invention

The present invention relates, in general, to solar energy systems and, in particular, to a new and useful solar power system and rocket which uses thermal storage for propelling and powering a spacecraft.

2. Description of the Related Art

In the spacecraft field, there are various systems and devices which utilize solar energy as a source of energy for performing various functions. U.S. Pat. No. 4,815,443 discloses a solar energy focusing assembly storage unit which is utilized to supply power to a spacestation. An integrated solar absorber-thermal storage assembly utilizes insulating layers and an independent helical fluid conduit assembly contained therein. A solar energy focusing unit is used to harness solar energy for entry into the absorber. The focusing unit focuses solar rays into a single aperture in the absorber assembly. The heating of the working fluid within the absorber drives a heat engine such as a closed Brayton cycle engine.

U.S. Pat. No. 4,830,092 discloses a solar collector and thermal power system having thermal energy storage units containing thermal energy storage canisters which are used in conjunction with heat enhancers and salt purifiers. A fluid is directed through the canisters to heat a phase change salt for powering the heat engine of a spacestation. The use of phase change salt restricts the system to operating at relatively low operating temperatures.

Although there has been much development in the solar power field, the development of the solar power devices has been segregated. One area of development is the development of solar-powered rockets. While, a separate area is the development of solar power systems for electronics.

Presently, there is no known system or device which utilizes a thermal storage medium to store thermal energy for both propelling a rocket and powering the electronics of the spacecraft containing that rocket.

SUMMARY OF THE INVENTION

The present invention pertains to a solar rocket system for both propelling and powering a spacecraft. The present invention utilizes a bi-modal or hybrid solar rocket which integrates two distinct systems of the craft, i.e. a propulsion system and an electrical power system. By combining these systems, the mass of the hybrid is reduced and the performance is greatly increased. The specific impulse of the solar rocket portion of the system operates well above that of chemical rockets. Thus, more payload can be delivered to final orbit. The present invention incorporates a thermal storage medium so that the system can provide electrical power when not in sunlight. This allows electrical power or thrust to be utilized for periods of time, without sunlight. The thermal storage media also allows the propulsive impulses or "burns" to be used at their most efficient locations in the orbit, such as perigee or apogee.

The present invention also utilizes a mirror assembly comprising independent mirrors which focus sunlight into a receiver or thermal storage device which transfers its heat into either propellant gas for thermal propulsion or into a thermal-to-electrical conversion system to produce electric power.

It is an object of the present invention to provide a system which allows for more payload mass to be delivered to orbit using a solar hybrid than can be delivered using independent chemical and photovoltaic systems.

It is another object of the present invention to provide a system having thermal storage media within a receiver for providing a spacecraft the ability to produce thrust or electrical power while in the darkness of the earth's shadow.

It is another object of the present invention to provide a system having independent pointing mirrors for focusing sunlight into a thermal storage receiver at any spacecraft orientation.

It is another object of the present invention to provide a system which utilizes a variety of propellants in order to strike a balance between tankage volume and high specific impulse.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a view illustrating the receiver in a thrust mode; and

FIG. 4 is a view illustrating the receiver in a power mode.

DESCRIPTION OF THE PREFERRED EMBODIMENT

The present invention comprises a bi-modal or hybrid solar rocket system for a spacecraft which utilizes thermal storage medium to propel the craft as well as power the electronics of the craft.

The present invention provides for a hybrid solar rocket incorporating a higher specific impulse than that of solid chemical rockets or cryogenic liquid chemical rockets. For missions where rockets are used to launch payloads from low earth orbit (LEO) to geosynchronous earth orbit (GEO), the higher specific impulse of the present invention allows for a more massive payload to be delivered to GEO, or for increased "station keeping" fuel to be carried to extend the life of the satellite.

The duration of the thrusting or burn of the rocket is limited by the amount of thermal energy stored in the system. When the stored energy is exhausted, the temperature of the propellant and the specific impulse fall accordingly. For this reason, the system employs short burns which last several minutes depending on the thermal storage capacity. This feature of the present invention is well-suited for perigee and apogee burns. When not in a thrusting mode, the remainder of the orbits for the spacecraft are used to recharge the thermal storage media with solar energy.

Figure 1:
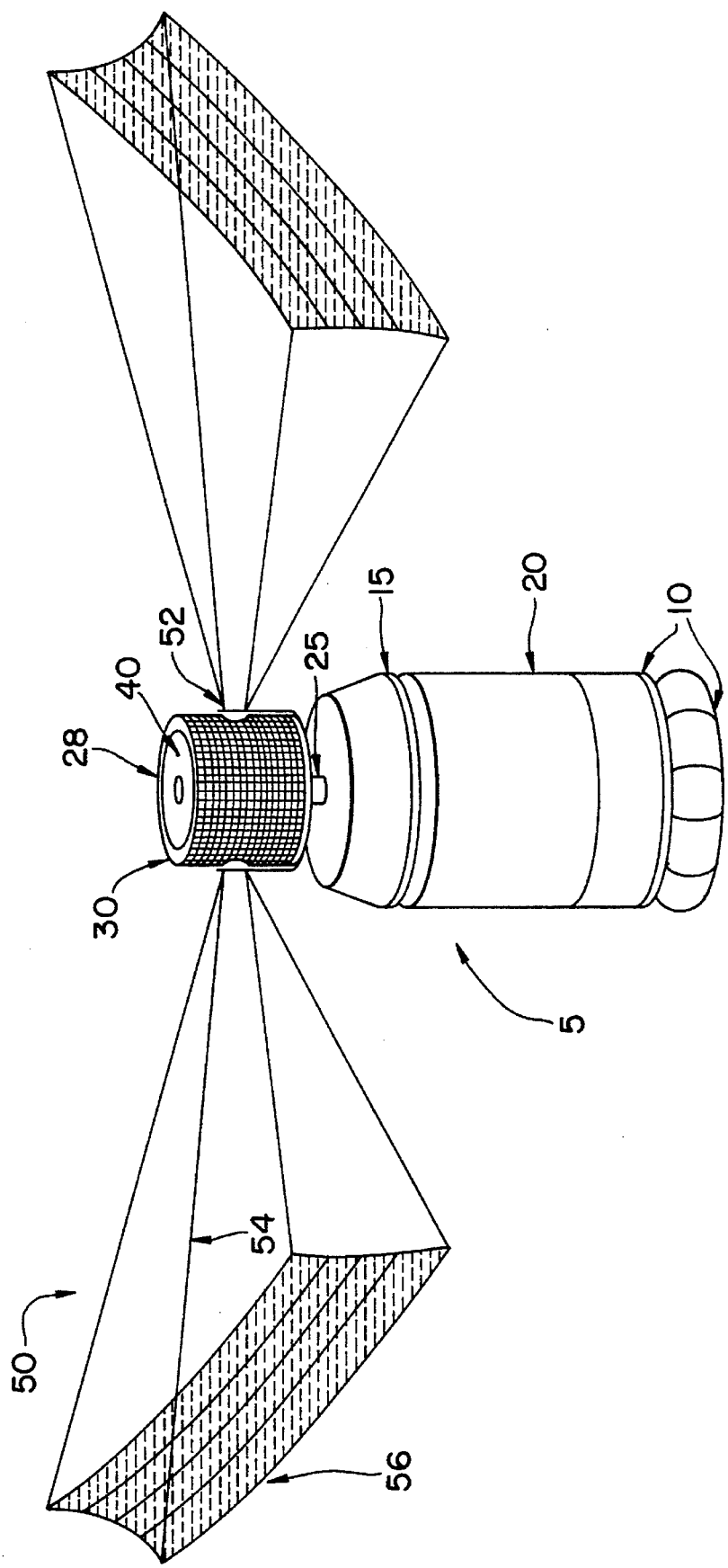
FIG. 1 is a perspective view of a spacecraft utilizing the present invention.

FIG. 1 illustrates a spacecraft 5 utilizing the present invention. The spacecraft comprises a payload 20 which is carried in orbit by a thermal storage receiver 30 which is used to propel and power the spacecraft 5. Spacecraft 5 utilizes a primary propellant contained in tanks 10, and a secondary propellant contained in tank 15. Propellant from tanks 10 and 15 are utilized to produce thrust for the spacecraft 5 and include propellants such as hydrogen, ammonia, methane or other suitable propellants. By heating the propellant from tanks 10 and 15, at nozzle 28, the spacecraft is propelled through its orbits.

A rotation bearing 25 is rotatably connected to the receiver 30 and the spacecraft 5 for ensuring rotation of the receiver 30.

Figure 5:
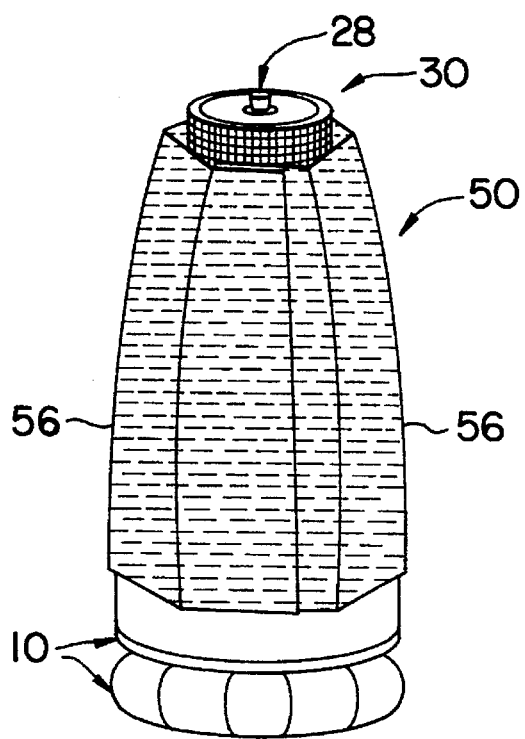
FIG. 5 is a perspective view of the stowed satellite showing the folded mirror segments.
Figure 6:
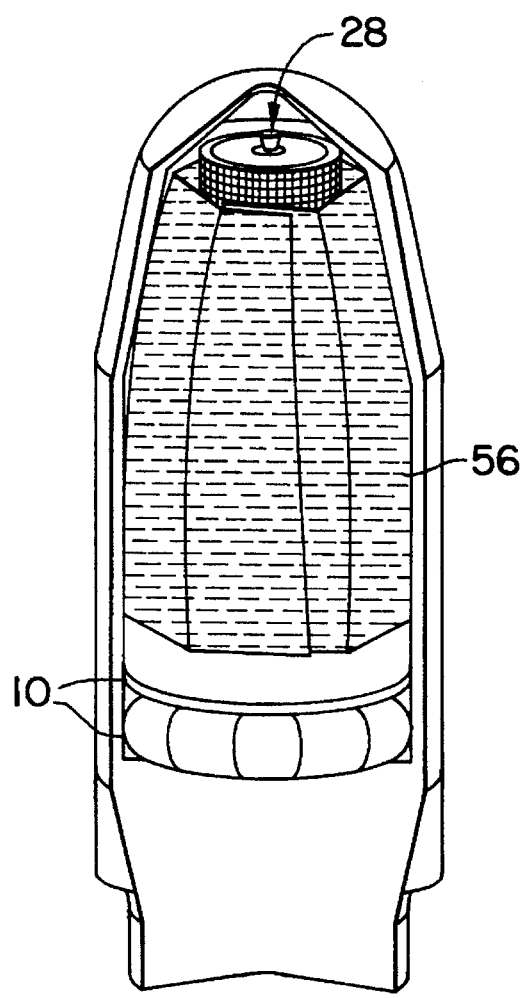
FIG. 6 is a view similar to FIG. 5 showing it installed in fairing with a section removed for a better view.

The present invention utilizes a mirror assembly 50 for providing solar energy to the receiver thermal storage device 30. The mirror assembly 50 comprises a collapsible mirror support 54 connected at one end to a mirror support bearing 52 located near the receiver 30. A plurality of rigid folding mirror segments 56 are attached at the opposite end of the mirror support 54 for harnessing the solar rays. Storage of the mirror assemblies can be performed in such a way as to minimize their stowed volume and impact on the packaging of the spacecraft within the launch fairing. FIGS. 5 and 6 show a stowed configuration of the mirrors assemblies over the outside of the spacecraft but within the dynamic envelope of the fairing (FIG. 6).

Figure 2:
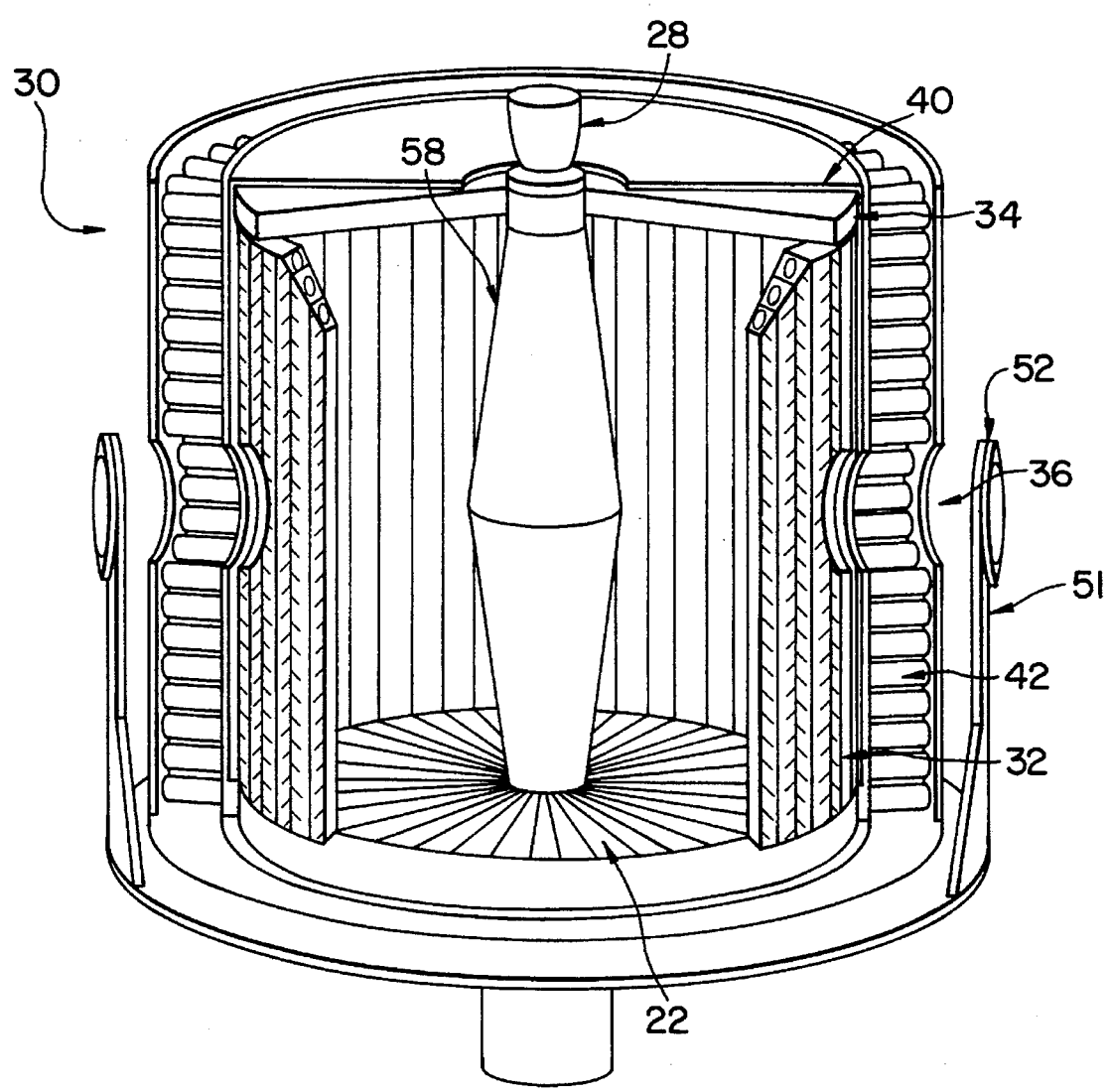
FIG. 2 is a sectional view of the receiver of FIG. 1.

The two mirror assemblies 50 focus sunlight into the receiver 30 having a hollow central thermal storage drum which is a wall of thermal storage material drum 32 as shown in FIG. 2. The receiver is configured to minimize re-radiation in periods at darkness while maximizing its "black-body" efficiency. The thermal storage material (such as boron or boron carbide) drum 32 comprises modules of silicon, silicon alloys or other high latent heat of fusion materials. The thermal storage modules 32 of the receiver 30 provide an internal wall for the receiver 30 for absorbing radiant energy. The outer wall of the drum is encased by a removably positioned diode insulation sleeve 40 which is retractable over the outer periphery of the thermal storage drum 32. This sleeve can be positioned through a series of lead screws or other fastening means.

An energy conversion medium 42 is located at the outer periphery of insulation sleeve 40 for converting the radiant energy stored in thermal storage material 32 to electrical power when the diode insulation sleeve 40 is retracted and exposes the outer surface of the thermal storage wall 32 as shown in FIG. 4.

The energy conversion wall 42 is any suitable radiant conversion material such as thermoelectric conversion material, i.e., alkaline metal thermal to electric converter (AMTEC), thermionic conversion material.

A plurality of tubes 22 provide the primary propellant and the secondary propellant from tanks 10 and 15 respectively to nozzle 28 which axially extends through the receiver 30 for providing thrust for the spacecraft 5 (FIG. 1).

A layer of receiver insulation 34 is provided near the top of receiver 30 at the top edge of the thermal storage modules 32 beneath the insulation sleeve 40.

As illustrated in FIG. 2, the receiver 30 has a pair of spaced apart apertures 36 or windows through the receiver 30, i.e., through the energy conversion material 42, the insulation sleeve 40 and the thermal storage material 32 in order to provide radiant energy to the interior space of the receiver 30.

A mirror support stand 51 having a hole therethrough is located at the receiver 30 and aligned with each aperture 36 of the receiver 30. A mirror support bearing 52 is rotatably mounted to the stand 51 and rotates around the hole of the stand 51. As shown in FIG. 1, the mirror support 54 of each mirror assembly 50 is connected to the mirror support bearing 52 which allows each mirror assembly 50 to be rotated about the stand 51 in order to point the mirrors 56 in the direction of incoming sunlight.

Two defocusing cones 58, which are mirrored, are located within the receiver 30 in order to accept the high heat fluxes associated with the highly concentrated light and to distribute radiant energy to the thermal storage modules 32 once the light is focused through the windows 36 of the receiver 30. The more the light is focused through the windows 36 of the receiver 30, the higher the temperature of the receiver 30. The control of the radiant energy or the flux by the mirrored defocusing cones 58 to the silicon modules 32 is necessary to ensure the integrity of the silicon modules 32 during the many thermal cycles, i.e., the freeze or frost cycles which they experience over the life of the satellite 5 (FIG. 1).

In order for the spacecraft 5 to produce thrust, the hydrogen, ammonia or other propellant from tanks 10 and 15 are routed through tubes 22 to nozzle 28 which form the heat exchanger. As the propellant flows, it removes energy from the thermal storage media 32. Where silicon is used as the thermal storage media 32, the propellant continues to flow through tubes 22 until the silicon has completely undergone a phase change, i.e. is frozen. The hot propellant is ultimately routed to the nozzle 28 located at the top of receiver 30 for the spacecraft 5.

By using the thermal storage material 32 as silicon, the outlet temperature of the propellant remains nearly constant as the silicon undergoes the phase change. For other storage media 32 which utilize high specific heat materials, the temperature of the propellant will fall gradually throughout the burn as the temperature of the storage media 32 falls.

FIG. 3 illustrates a thrust mode for the present invention in which electrical power generation is interrupted by locating the diode insulation sleeve 40 over the thermal storage material 32. Thus, during the thrusting mode, the stored thermal energy from storage material 32 is transferred into the propellant by forced convection. The electrical power for the craft 5 (FIG. 1) is interrupted by inserting the insulation sleeve 40 between the outer surface of thermal material 32 and the hot shoes of the conversion system 42. When electrical power generation is desired the insulation sleeve or drum 40 is removed or retracted as illustrated in FIG. 4.

If the spacecraft 5 is thrusting in sunlight, the propellant can be heated to temperatures potentially higher than the storage media temperature by heating after it passes through the heat exchanger or post-heating phase.

The thermal storage media 32 greatly reduces the required mirror area as compared to the known solar rockets because the sunlight is stored for long periods of time. In the known solar rockets, the rocket can only utilize whatever solar energy the rocket receives directly.

The addition of secondary propellant such as ammonia or methane 15, allows the system, including tankage, to be sized for volume as well as performance. The volume of the system can therefore be tailored to fit into the given launch vehicle faring. In addition, these propellants liquify at relatively high temperatures compared to hydrogen thus making them advantageous in the event orbit changes are needed during the life of the satellite 5. These propellants are storable in space and can be utilized upon demand.

The mirrors 56 for the present invention can encompass other embodiments such as inflatable or meshed type mirrors or other suitable forms.

The present invention provides for a combined propulsion and power solar rocket for a spacecraft which integrates both the electrical power and propulsive systems for the spacecraft. This increases the performance of the spacecraft because the system can produce thrust at higher specific impulse then that provided by the known chemical rockets. The present invention allows for an increase in the amount of mass that a given launch vehicle can place into orbit.

The present invention also allows the spacecraft the ability to produce thrust or electrical power while in the darkness of the earth's shadow because of its thermal storage capability. The independent pointing mirrors of the present invention allow for the focusing of sunlight into the thermal storage unit at any spacecraft orientation.

While specific embodiments of the invention have been shown and described in detail to illustrate the application of the principles of the invention, it will be understood that the invention may be embodied otherwise without departing from such principles.

What is claimed is:

1. A solar rocket for propelling and powering a craft, the rocket comprising:

a drum of thermal storage material having an interior space and an outer periphery;

propulsion means axially extending through the drum;

an insulation sleeve having an outer surface and removably located at the outer periphery of the drum;

energy conversion means located at the outer surface of the insulation sleeve;

the drum, the insulation sleeve and the energy conversion means forming a receiver, the receiver having a pair of spaced apart holes therethrough leading into the interior space of the drum; and mirror means for focusing light into the interior space through the holes.

2. The rocket according to claim 1, including internal mirror means located within the interior space of the drum for deflecting light into the thermal storage material.

3. The rocket according to claim 2, wherein the thermal storage material comprises a plurality of modules.

4. The rocket according to claim 2, wherein the thermal storage material comprises silicon.

5. The rocket according to claim 2, wherein the thermal storage material comprises boron.

6. The rocket according to claim 2, wherein the thermal storage material comprises boron carbide.

7. The rocket according to claim 2, wherein the energy conversion means comprises thermoelectronic conversion means.

8. The rocket according to claim 7, wherein the thermoelectronic conversion means comprises an alkali metal thermal to electric converter.

9. The rocket according to claim 2, wherein the energy conversion means comprises thermionic conversion means.

10. The rocket according to claim 1, wherein the propulsion means comprises a primary propellant source for providing a primary propellant.

11. The rocket according to claim 10, wherein the propulsion means further comprises a secondary propellant source for providing a secondary propellant.

12. The rocket according to claim 11, wherein the propulsion means further comprises a plurality of tubes for carrying the primary and the secondary propellants.

13. The rocket according to claim 12, wherein the propulsion means further comprises a nozzle connected to the tubes.

14. The rocket according to claim 2, wherein the internal mirror means comprises at least one defocusing cone.

15. The rocket according to claim 2, wherein the internal mirror means comprises a plurality of defocusing cones.

16. The rocket according to claim 1, wherein the mirror means comprises a stand having an aperture therethrough near each hole of the receiver.

17. The rocket according to claim 16, wherein the mirror means further comprises a support bearing rotatably mounted to each stand around the aperture.

18. The rocket according to claim 17, wherein the mirror means further comprises a mirror support connected to each support bearing at one end of the mirror support and a mirror assembly connected at the other end of the mirror support.

19. The rocket according to claim 18, wherein the mirror assembly comprises a plurality of foldable mirrors.

20. The rocket according to claim 2, including bearing means for facilitating rotation of the receiver.

\* \* \* \* \*